(12) United States Patent
Yang

(10) Patent No.: US 8,611,098 B2
(45) Date of Patent: Dec. 17, 2013

(54) RELEASING APPARATUS FOR SIM CARD

(75) Inventor: Xin Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 319 days.

(21) Appl. No.: 13/191,467

(22) Filed: Jul. 27, 2011

(65) Prior Publication Data
US 2012/0300415 A1 Nov. 29, 2012

(30) Foreign Application Priority Data
May 26, 2011 (CN) .......................... 2011 1 0138516

(51) Int. Cl.
*H05K 5/00* (2006.01)

(52) U.S. Cl.
USPC ........... 361/754; 361/737; 361/810; 361/818; 224/282; 224/539; 201/45; 439/155; 439/329

(58) Field of Classification Search
USPC .......... 361/754, 737, 810, 818; 224/282, 539; 201/45; 439/155, 329
See application file for complete search history.

(56) References Cited

U.S. PATENT DOCUMENTS

| | | | | |
|---|---|---|---|---|
| 5,280,848 A | * | 1/1994 | Moore | 224/282 |
| 5,520,313 A | * | 5/1996 | Toshihide | 224/539 |
| 6,024,384 A | * | 2/2000 | Jones et al. | 281/45 |
| 6,093,039 A | * | 7/2000 | Lord | 439/155 |
| 7,830,672 B1 | * | 11/2010 | Kitchen | 361/818 |
| 8,345,447 B2 | * | 1/2013 | Peng et al. | 361/810 |
| 2011/0008985 A1 | * | 1/2011 | Matsumoto et al. | 439/329 |
| 2012/0033388 A1 | * | 2/2012 | Peng et al. | 361/737 |

\* cited by examiner

*Primary Examiner* — Xiaoliang Chen
(74) *Attorney, Agent, or Firm* — Altis Law Group, Inc.

(57) ABSTRACT

A releasing apparatus for a subscriber identity module (SIM) card includes a bracket, a rack received in the bracket for manipulating the SIM card, a pivot pole pivotably received in the bracket, and a movable member pivotably attached to the bracket. The movable member includes a biasing portion and an engaging portion formed from opposite ends of the movable member. A tab and a biasing protrusion are formed from opposite ends of the pivoting member. The engaging portion is operated to rotate the movable member. The biasing portion presses the tab of the pivot pole to rotate the pivot pole. The biasing protrusion biases the rack and SIM card away from the bracket.

8 Claims, 4 Drawing Sheets

RELEASING APPARATUS FOR SIM CARD

BACKGROUND

1. Technical Field

The disclosure relates to a releasing apparatus for a subscriber identity module (SIM) card.

2. Description of Related Art

An SIM card is usually fitted in an electronic device, such as a mobile phone. Due to its small size, and the need to ensure a clean and complete electrical connection for all its terminals, the SIM card needs to be firmly engaged in the electronic device, and is difficult to release without risk of damage.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
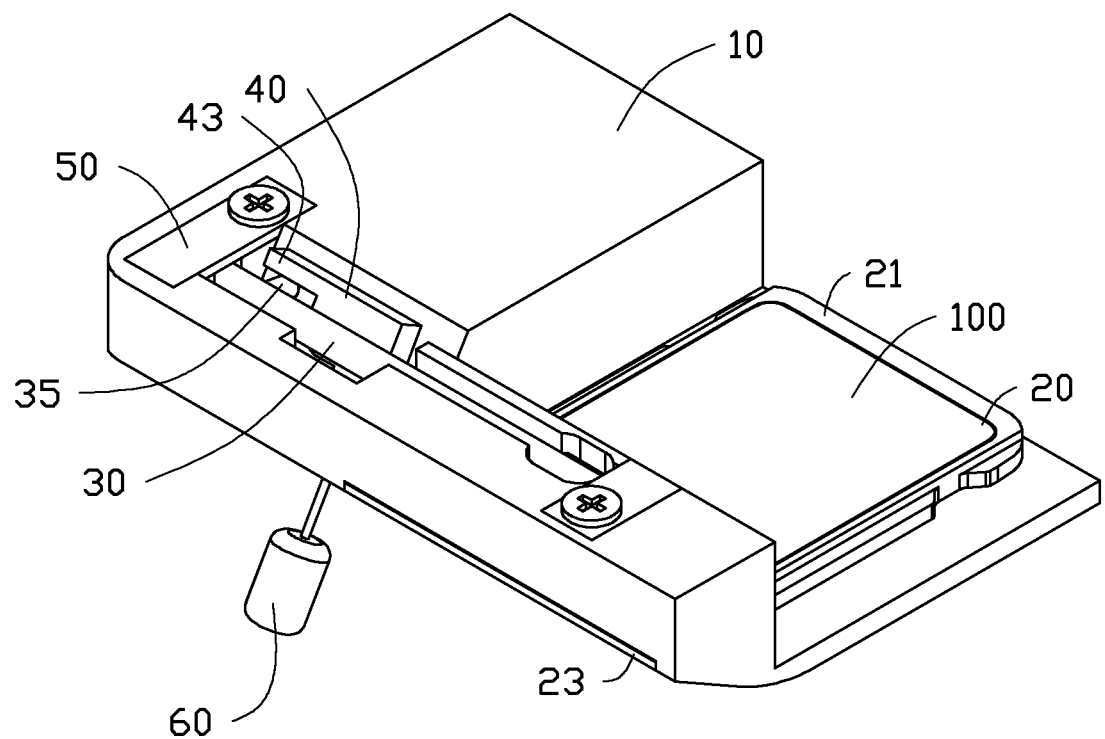
FIG. 1 is an isometric view of an embodiment of an assembled releasing apparatus for a subscriber identity module (SIM) card.
Figure 2:
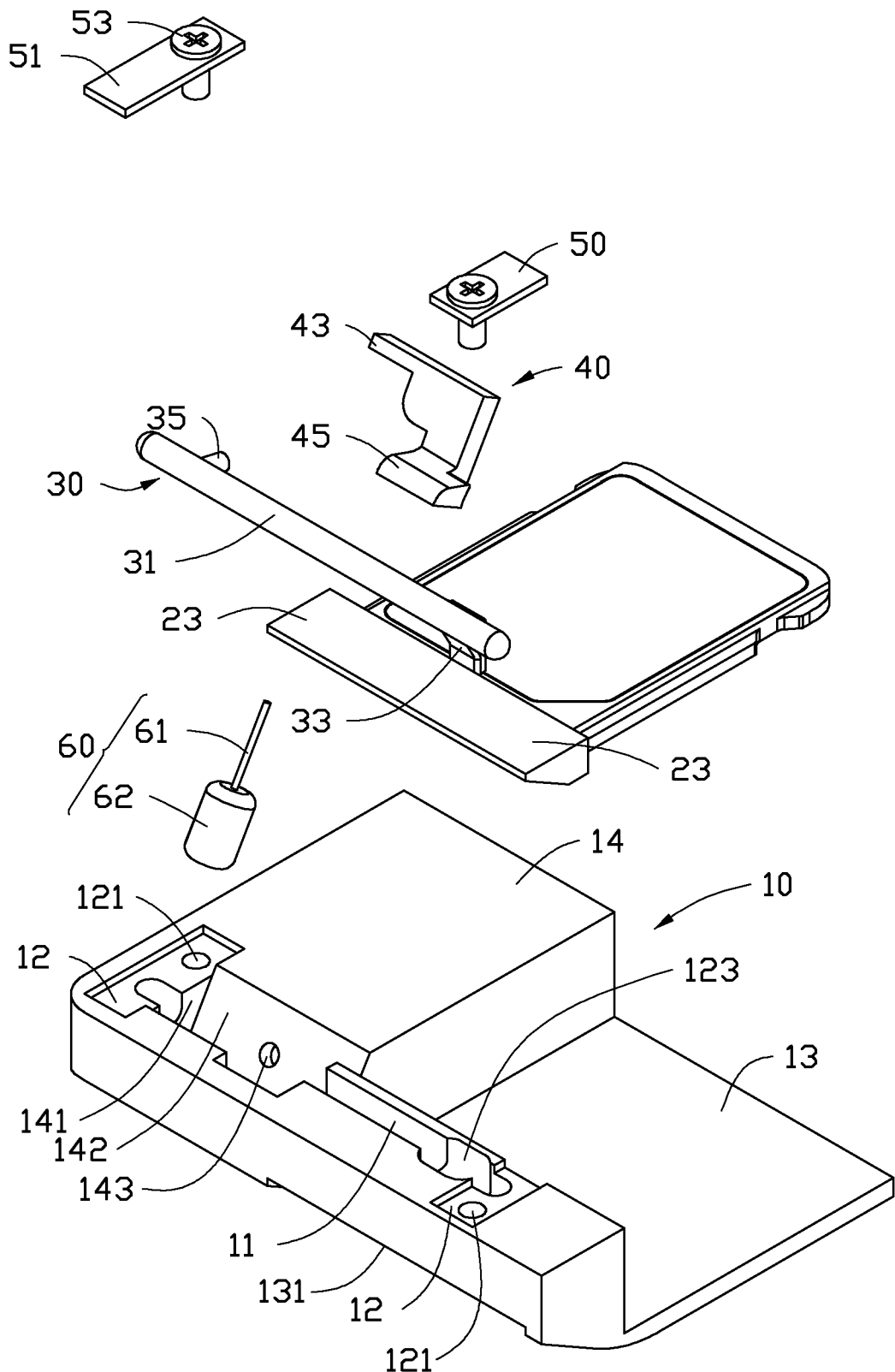
FIG. 2 is an exploded, isometric view of FIG. 1, the releasing apparatus including a movable member.

Referring to FIG. 1 and FIG. 2, a releasing apparatus for a subscriber identity module (SIM) card 100 includes a bracket 10, a rack 20, a pivot member 30, a movable member 40, two fixing members 50, and a pin 60. The rack 20 is used for manipulating the SIM card 100.

The bracket 10 defines an elongated receiving slot 11 in a side of a top of the bracket 10, and two recesses 12 in the top at opposite ends of the receiving slot 11 and communicating with the receiving slot 11. The recesses 12 each define a fixing hole 121 in a bottom of the recess 12. A receiving space 13 is defined in the bracket 10 at a side of the receiving slot 11, with a raised portion 14 formed at an end of the receiving space 13. A through hole 141 is defined in the raised portion 14, from top to bottom of the raised portion 14 and faces the receiving slot 11. The through hole 141 communicates with the receiving slot 11. A sloped surface 142 is formed from the raised portion 14, facing and bounding the receiving hole 141. A pivot hole 143 is defined in the sloped surface 142. A slot 131 is defined in a bottom of the bracket 10, below the receiving slot 11 and communicating with the receiving space 13. A through hole 123 is defined in the bracket 10 from the top to bottom of the bracket which communicates with the receiving slot 11 and the slot 131.

The rack 20 includes a plate 21 and a stepped portion 23 formed from a side of the plate 21. The SIM card 100 is fixed on the plate 21.

The pivot member 30 includes a shaft 31, a biasing protrusion 33 extending in a substantially perpendicular manner from a first end of the shaft 31, and a tab 35 extending in the same manner from a second end of the shaft 31. The biasing protrusion 33 is right-angled from the tab 35.

Figure 3:
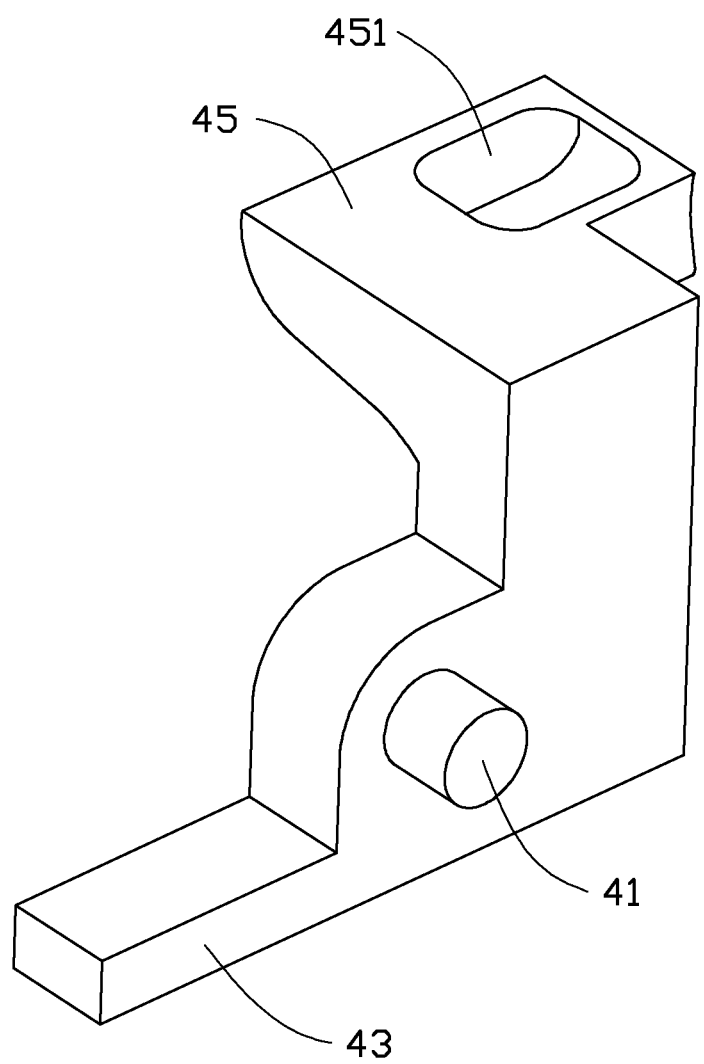
FIG. 3 is an inverted and enlarged view of the movable member of FIG. 2.

Referring to FIG. 3, the movable member 40 is substantially L-shaped, and includes a pivot pole 41 protruding on a center of the movable member 40, a biasing portion 43 extending from a first end of the movable member 40, and an engaging portion 45 extending from a second end of the movable member 40. A depressed portion 451 is defined in the engaging portion 45.

Each fixing member 50 includes a plate 51 and a screw 53 extending through the plate 51.

The pin 60 includes a columnar handle 62 and a thin portion 61 extending from one end of the handle 62.

Referring to FIG. 1 again, in assembly, the movable member 40 is set on the sloped surface 142. The pivot pole 41 is pivotably inserted in the pivot hole 143. The pivot member 30 is positioned in the receiving slot 11. The fixing members 50 are located in the recesses 12, respectively. The screws 53 are screwed in the fixing holes 121 to locate the opposite ends of the pivot member 30. The tab 35 is under the biasing portion 43. The biasing protrusion 33 extends through the through hole 123 to enter the slot 131. The rack 20 is inserted into the receiving space 13 through the slot 131. The stepped portion 23 is located in the slot 131 to engage with the biasing protrusion 33.

Figure 4:
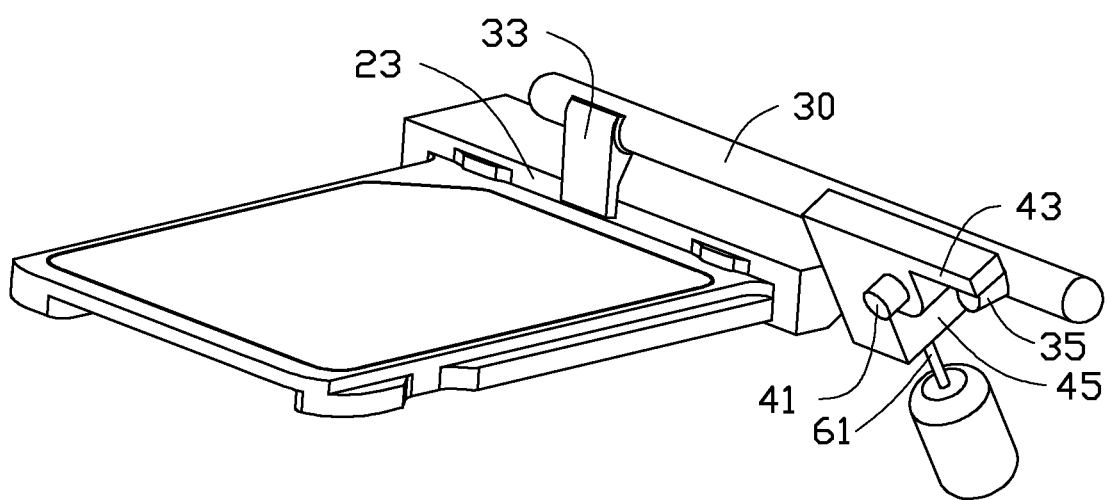
FIG. 4 is a view of the releasing apparatus partially assembled, showing a state of use.

Referring to FIG. 4, in use, when releasing the rack 20, the handle 62 is operated to make the thin portion 61 resist against a bottom of the depressed portion 451 of the engaging portion 45. The movable member 40 is pivoted around the pivot pole 41. The biasing portion 43 biases the tab 35 to rotate the pivot member 30. The biasing protrusion 33 engages with the stepped portion 23 to move the rack 20 away from the receiving space 13 through the slot 131.

In an alternative embodiment, the pin 60 may be replaced with a slim rod or similar object such as a toothpick.

It is to be understood, however, that even though numerous characteristics and advantages of certain embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A releasing apparatus for a subscriber identity module (SIM) card, the releasing apparatus comprising:
   a bracket;
   a rack received in the bracket for supporting the SIM card;
   a pivot member pivotably attached to the bracket, wherein the pivot member comprises a biasing protrusion and a tab respectively formed at opposite ends of the pivot member; and
   a movable member comprising a pivot pole, and a biasing portion and an engaging portion respectively formed at opposite sides of the pivot pole, wherein the movable member is pivotably attached to the bracket through the pivot pole;
   wherein the engaging portion of the movable member is operable to rotate the movable member about the pivot hole, the biasing portion of the movable member biases the tab of the pivot member to rotate the pivot member, the biasing protrusion biases the rack to move away from the bracket.

2. The releasing apparatus of claim 1, wherein the pivot member comprises a shaft pivotably received in the bracket, the biasing protrusion extends down in a substantially perpendicular manner from a first end of the shaft, the tab extends in a substantially perpendicular manner from a second end of the shaft, the biasing protrusion and the tab are right-angled.

3. The releasing apparatus of claim 1, wherein the engaging portion defines a depressed portion.

4. The releasing apparatus of claim 1, wherein the bracket defines a receiving slot in a top of the bracket, the pivot member is pivotably received in the receiving slot.

5. The releasing apparatus of claim 4, wherein the bracket defines a receiving space to receive the rack, and a slot communicating with the receiving space, the rack enters the receiving space through the slot.

6. The releasing apparatus of claim 5, wherein the bracket further defines a through hole communicating with the receiving slot and the slot, the biasing protrusion of the pivot member extends through the through hole to be positioned in the slot to engage with the rack.

7. The releasing apparatus of claim 6, wherein the rack comprises a stepped portion formed from one end of the rack, the stepped portion is located in the slot and engages with the biasing protrusion.

8. The releasing apparatus of claim 5, wherein the bracket forms a raised portion at a side of the receiving space, the raised portions forms a sloped surface facing the receiving slot, a pivot hole is defined in the sloped surface to pivotably receive the pivot pole of the movable member.

\* \* \* \* \*